S. MAY.
METHOD OF MAKING SAUSAGE CASINGS.
APPLICATION FILED SEPT. 3, 1912.
1,063,713.
Patented June 3, 1913.
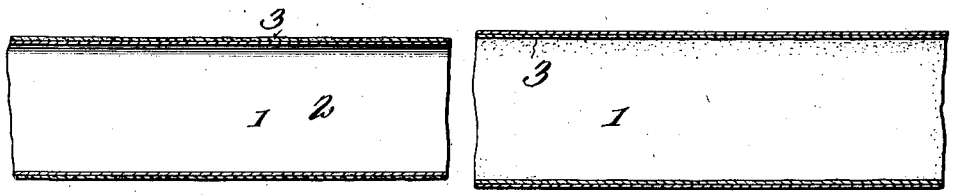
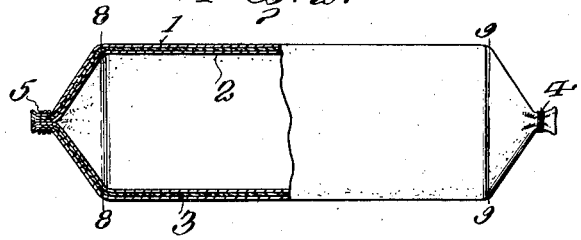
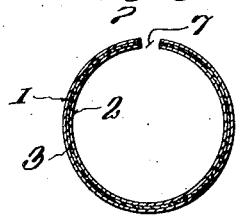
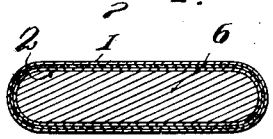
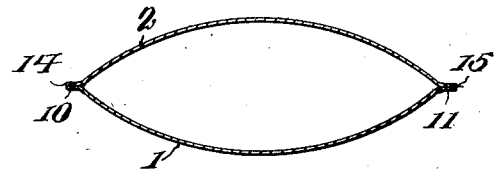
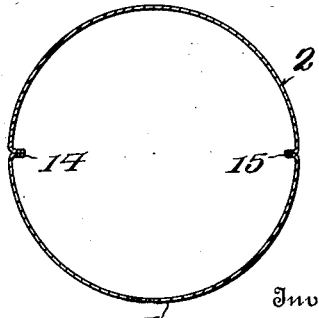
Inventor
Solomon May

UNITED STATES PATENT OFFICE.

SOLOMON MAY, OF CHICAGO, ILLINOIS.

METHOD OF MAKING SAUSAGE-CASINGS.

1,063,713.   Specification of Letters Patent.   Patented June 3, 1913.

Application filed September 3, 1912. Serial No. 718,347.

*To all whom it may concern:*

Be it known that I, SOLOMON MAY, a citizen of the United States, residing at 4824 St. Lawrence avenue, Chicago, in the county of Cook, State of Illinois, have invented certain new and useful Improvements in Methods of Making Sausage-Casings, of which the following is a description, reference being had to the accompanying drawing and to the figures of reference marked thereon.

The invention relates to a new and useful improvement in methods of making sausage casings, and more particularly to sausage casings which are made from animal intestines.

An object of the invention is to make a sausage casing from an animal intestine which shall be of larger capacity in cross sectional area than the intestine from which the casing is made.

A further object of the invention is to form and shape regular sized casings from intestines which vary in size.

These and other objects will in part be obvious, and will in part be hereinafter more fully described.

In the drawings, which show by way of illustration one embodiment of the invention, Figure 1 represents two sections of the intestines, one turned inside out, and illustrates the first step in the method of making the sausage casing; Fig. 2 is a view partly in section showing the two sections placed one into the other and distended for drying; Fig. 3 shows the sections cut longitudinally; Fig. 4 shows the sections inserted one in the other and dried over a form; Fig. 5 shows the sections of the intestines shaped and stitched along each longitudinal edge; Fig. 6 is a cross sectional view showing the inner surfaces of the sections separated, and Fig. 7 is a cross sectional view showing the casing turned and in its finished form.

In carrying out the invention I take two sections of an intestine, 1 and 2, or two separate intestines. It will be understood that these intestines may be first cured in salt and soaked in water to render them soft and pliable. The fat may be then removed by scraping or otherwise from the outer surface, but on the inner surface there is left a layer of fat or slimy material, indicated at 3 in the drawings. Section 2, as shown in Fig. 1, is turned inside out so as to bring the slimy surface to the outer face of the section. This section 2 is then inserted in the section 1 of the intestine. The built up tubular casing is then distended and dried so that the slimy surfaces will temporarily adhere to each other. This may be brought about by tying the ends 4 and 5, see Fig. 2, and inflating the casing with air or the like. It sometimes happens, however, that the intestines are punctured so that this method of drying cannot be utilized, in which case the tubular casing referred to is placed on a form 6, which serves to stretch the casing and hold the slimy surfaces of the two sections in contact so that when the material dries the two sections will adhere to each other. Instead of distending the intestines on a form, as above noted, they may also be cut longitudinally and spread out on a board, distended and secured along the edges to the board, and thus dried. While, as above noted, it is usually desirable to place the natural inner surfaces in contact before drying, I have found it is also practicable to place one section of intestine within another without inverting, or to place the outer surfaces of the intestines together, and when the sections are distended so as to bring the surfaces into contact and then dried, they will adhere so as to hold said sections properly positioned relative to each other until the edges are stitched. After the tubular casing referred to is thoroughly dried, it may be cut longitudinally, as at 7, see Fig. 3. The ends of the casing may be also cut on the lines 8—8 and 9—9, if desired, so as to provide a smooth section of casing. The material can be spread out flat, as indicated in Fig. 5, and the two layers of intestinal material will be held in place one on the other. The material may now be shaped so as to taper the same slightly, as indicated in Fig. 5, if desired, and also so that the resulting sausage casings will be of uniform size. The material is then stitched along each longitudinal edge by a line of stitching 10, and a line of stitching 11. After the material has been stitched along each longitudinal edge, it is then soaked in water or otherwise treated, so that the inner faces of the two sections of material, which are adhering together, may be separated from each other, so as to form a circular space 12, see Fig. 6. The sausage casing thus formed is preferably turned inside out so as to bring the stitched edges 14 and 15 to the inner side of the casing, as shown in Fig. 7.

From the above method, it will be seen that the circumference of the resulting sausage casing is substantially twice that of the intestine from which the sausage casing is made. By this method small intestines may be utilized for making sausage casings of a commercial size. Furthermore, by the above method, wherein the material in the two sections is temporarily stuck together, I am able to handle said material to a much better advantage with little resulting waste to the material. Where the intestines are cut and sewed, when in undried, or partly dried condition, the handling thereof is very difficult, for the reason that the edges are not even and spread away from each other, and if the edges are secured by sewing, a large margin must be allowed to prevent tearing. This is all avoided by my improved method, as above noted.

While I prefer to use in the making of my improved sausage casing animal intestines, and particularly the large intestine of the hog, it will be understood that the invention, from certain aspects, applies equally to the use of any membranes which may be utilized for sausage coverings.

While I have described a method which involves the cutting of the edges and the subsequent stitching of the same, it will be obvious that from certain aspects of the invention the stitching may be made prior to the cutting on cylinder stitching machines adapted for this purpose, and also the stitching and cutting may be simultaneously made without departing from the spirit of the invention. It will be further understood that from certain aspects of the invention, in place of stitching each longitudinal edge, the superposed edges may be otherwise secured. The essential features of my invention comprise the securing together the layers or sections which facilitates the handling of the same, and the securing of the edges so that the resulting casing is of greater cross sectional capacity than that of the intestine from which it is made.

Having thus described my invention, what I claim as new and desire to secure by Letters Patent, is:—

1. The herein described method of making sausage casings consisting in placing the distended surfaces of two sections of intestines in contact, drying said sections until adjacent surfaces adhere, cutting the sections and securing the superposed edges of the section along each longitudinal edge and separating the adjacent faces of the two intestines.

2. The herein described method of making sausage casings, consisting in placing one section of intestine within another, distending the sections until the adjacent surfaces are in contact, drying until said sections adhere, cutting the sections longitudinally and securing the superposed edges of the sections along each longitudinal edge, and separating the adjacent faces of the two sections of intestines.

3. The herein described method of making sausage casings, consisting in placing one section of intestines within another, distending the sections until the adjacent surfaces are in contact, drying until such sections adhere, cutting the sections longitudinally, stitching the superposed sections together along each longitudinal edge, and separating the adjacent faces of the two sections of intestines and turning the casing so as to bring the stitched edges inside the casing.

In testimony whereof I affix my signature, in the presence of two witnesses.

SOLOMON MAY.

Witnesses:
 BRUNO J. PRYSTALSKI.
 CLARA BELSKEY.